United States Patent [19]

Pasternack

[11] Patent Number: 4,611,628

[45] Date of Patent: Sep. 16, 1986

[54] ATTENUATOR VALVE FOR A PRESSURE-GAS CONDUIT

[75] Inventor: Adalbert Pasternack, Bad Schwartau, Fed. Rep. of Germany

[73] Assignee: Drägerwerk Aktiengesellschaft, Lübeck, Fed. Rep. of Germany

[21] Appl. No.: 739,292

[22] Filed: May 30, 1985

[30] Foreign Application Priority Data

Jul. 4, 1984 [DE] Fed. Rep. of Germany ....... 3424503

[51] Int. Cl.⁴ ............................................ F16K 17/30
[52] U.S. Cl. .................................... 137/509; 137/613; 251/37; 251/44
[58] Field of Search ...................... 137/509, 510, 599.2, 137/613, 614.2; 251/27, 37, 44; 222/3, 399

[56] References Cited

U.S. PATENT DOCUMENTS

| 2,329,001 | 9/1943 | Robinson .......................... 251/44 X |
| 3,132,667 | 5/1964 | Baker et al. ...................... 137/599.2 |
| 3,273,590 | 9/1966 | Woodward ......................... 137/510 |
| 4,444,230 | 4/1984 | Van Mullem ................. 137/614.2 X |

FOREIGN PATENT DOCUMENTS

| 1429066 | 11/1968 | Fed. Rep. of Germany ... 137/614.2 |
| 544834 | 6/1956 | Italy .................................. 137/614.2 |
| 769310 | 3/1957 | United Kingdom ................ 137/881 |

Primary Examiner—A. Michael Chambers
Assistant Examiner—John C. Fox
Attorney, Agent, or Firm—Walter Ottesen

[57] ABSTRACT

A sealing valve either blocks or releases the gas held under pressure in a gas cylinder, for example. When the sealing valve is opened, the flow path is opened and a pressure impact travels to the equipment connected downstream of the valve and can cause damage thereto. The attenuator valve of the invention is disposed in the pressure-gas conduit between the pressure-gas source and the sealing valve and prevents this kind of an impact from occurring. Since the attenuator valve of the invention is controlled exclusively by pressure, it can be mounted at any location in the pressure-gas conduit. The attenuator valve of the invention includes a housing and a valve body mounted in the housing which shuts off the pressure-gas conduit with the aid of a closure cone which is held in sealing contact to a conical valve recess by means of a spring. The pressurized gas in the cylinder is present above the valve body via an alternate path. When the pressure of the gas beneath the valve body drops, this pressurized gas above the valve body causes the same to be lifted from its conical valve recess against the force of the spring thereby causing a slowed flow of gas which is free of impact to pass through the sealing valve to the equipment.

5 Claims, 2 Drawing Figures 4,611,628

ATTENUATOR VALVE FOR A PRESSURE-GAS CONDUIT

FIELD OF THE INVENTION

The invention is directed to an attenuator valve for use in a pressure-gas conduit which incorporates a valve body which closes in flow direction under the force of a spring.

BACKGROUND OF THE INVENTION

German published and examined patent application DE-AS No. 14 29 066 discloses a connector having a component in the form of an attenuator valve of this kind for pressure-gas conduits.

This connector includes in the form of a combination the sealing body of the sealing valve needed for the high-pressure line and a safety valve mechanically connected to the latter. The safety valve opens slowly after the sealing body has been activated so that no pressure impact from the pressure-gas conduit can load sensitive equipment connected in series with the conduit. The sealing body can be opened, for example, with the aid of a rod from the outside. The attenuator valve of this invention can be inserted at any desirable location in the pressure-gas conduit between the sealing valve and the source of pressure gas.

The German patent application referred to above discloses a connector for gas-supply conduits which includes two coaxial valve seats inside a housing. The valve seats coact with respective movable sealing bodies to define respective valves. The first one of the valves is a sealing valve and the second one of the valves is a safety valve mounted in the direction of flow ahead of the first valve. Both valves close with the flow under the force of a spring. The valve body for the sealing valve includes a stepped shaft. The sealing body for the safety valve is mounted so as to be movable along the first step of this shaft which extends to the valve body. The play between the sealing body and the shaft defines a calibrated gas outlet. A spacer spring is mounted between the valve body and the sealing body and is configured so as to attempt to increase the distance between the two bodies. Two springs are mounted one inside the other about the end of the shaft and are each braced on the housing with one end toward the shaft end. With the other end, the outer spring slides with a spring plate over a second step of the shaft and supports itself either on the sealing body or on the end of the first step of the shaft in dependence upon the position of the valve body and its shaft. The inner spring is braced at the end of the second step of the shaft and closes the valve body.

In order to release the flow of gas, a rod is actuated from the outside. The rod is located in an insertable release valve or other device and opens the valve body against the inner spring and, at the same time, lifts the outer spring from the sealing body by means of the shaft with the first step of the latter. However, this sealing body remains on its valve seat under the continuing present pressure difference which continues to be present until this pressure difference is balanced by means of the calibrated play between the sealing body and the shaft. Thereafter, the sealing body lifts under the action of the spacer spring and slowly opens the through passage.

SUMMARY OF THE INVENTION

It is an object of the invention to improve upon an attenuator valve in connectors for gas-supply conduits so that the attenuator valve defines a complete component which can be inserted in the pressure gas conduit at any desired location between the sealing valve and the pressure-gas source. It is a further object of the invention to provide an attenuator valve in the form of a complete component which prevents pressure impacts from loading equipment which is connected downstream of the attenuator valve when the sealing valve is opened.

In the many known configurations, the attenuator valves are part of a combination which includes sealing valves on pressure-gas cylinders and require a mechanical connection between the sealing valves and the attenuator valve. In contrast to the foregoing, the advantages of the invention are seen in that the attenuator valve is controlled only by the gas pressure and therefore can be configured as a separate component. The component can be of simple configuration and can be later retrofitted at any desired location in the pressure-gas conduit between the pressure-gas source and the sealing valve.

BRIEF DESCRIPTION OF THE DRAWING

The invention will now be described with reference to the drawing wherein.

DESCRIPTION OF THE PREFERRED EMBODIMENTS OF THE INVENTION

Figure 1:
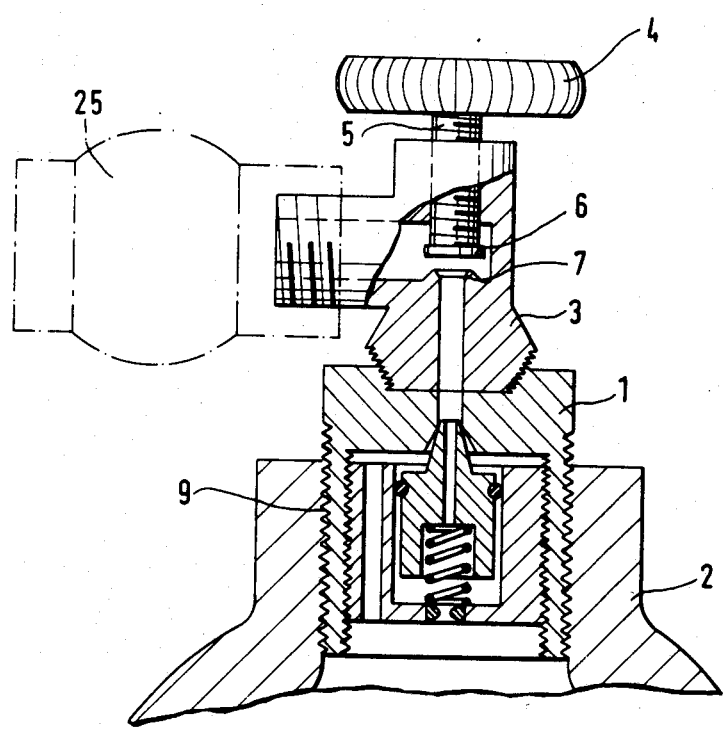
FIG. 1 is a side elevation view, in section, of an attenuator valve according to the invention and is shown mounted between a gas cylinder and the sealing valve; and, FIG. 2 is a side elevation view, in section, showing details of the attenuator valve of the invention shown in FIG. 1.
Figure 2:
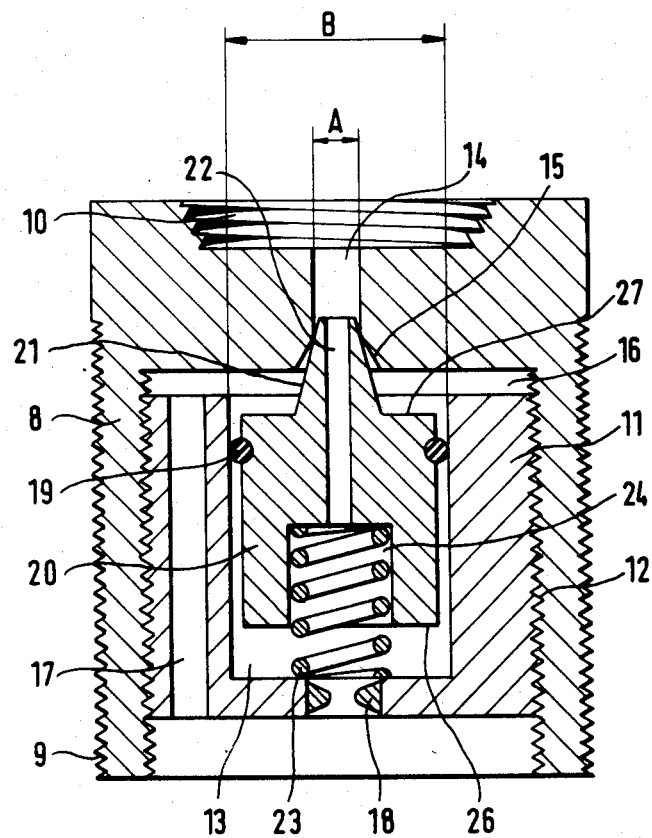

FIG. 1 shows an attenuator valve 1 threadably engaged with a gas cylinder 2 in the conventional manner. A hand-driven sealing valve 3 is connected into the same fitting downstream of the attenuator valve as shown.

The sealing valve includes a hand wheel 4 and a spindle 5 for moving the sealing part 6 with respect to the valve seat 7.

The attenuator valve 1 includes a housing 8 with an outer connecting winding 9 on the gas inflow end and an inner connecting winding 10 at the gas outflow end. The attenuator valve 1 further includes a chamber piece 11 which is held in the housing 8 by means of winding 12. The chamber piece 11 defines a chamber 13 within the housing 8. The chamber 13 communicates with and is open to the outflow end whereat the inner connecting winding 10 is located and communicates with the outflow end via an outflow bore 14 which begins in a conical valve recess 15. The chamber piece 11 includes a plurality of bores 17 for admitting gas into the intermediate space 16. The chamber 13 communicates directly with the high-pressure end via a constricted opening or throttle 18.

The chamber 13 includes a valve body 20 which is movably mounted therein and is sealed with respect thereto by means of an o-ring 19. The valve body 20 includes a closure cone 21 which lies opposite the conical valve recess 15 and is adapted for engagement therewith. The central bore 22 connects the free space of the chamber 13 with the outflow bore 14. A closing spring 23 spring-loads the valve body 20 in the closed position. The closing spring 23 is guided in a recess 24 formed in the valve body 20.

When the sealing valve 3 is closed, an equal pressure exists from within the gas cylinder 2 up to the sealing part 6 pressed against the valve seat 7. When the sealing part 3 is opened, the pressure falls in the outflow bore 14.

The quantity of gas for which the pressure drops here is only a small amount and cannot lead to a dangerous pressure impact in the equipment 25 connected downstream of the sealing valve 3. At the same time, a stream of gas begins to flow into the chamber 13 through the throttle 18. The pressure is thereby reduced to an amount which is not dangerous so that the same reduced gas pressure is present at the inner circular surface A of the closure cone 21 and the lower base end 26 of the valve body 20. However, the pressure of the gas in the tank 2 which is present in the intermediate space 16 acts on the outer annular surface (surface B–surface A) of the upper end face 27 of the valve body 20. This higher pressure causes a displacement of the valve body 20 against the closing spring 23 and causes the closure cone 21 to become unseated from the conical valve recess 15. After this opening which is delayed in time with respect to the opening of the sealing valve 3, there begins the flow of high-pressure gas to the equipment 25 without a pressure impact.

It is understood that the foregoing description is that of the preferred embodiments of the invention and that various changes and modifications may be made thereto without departing from the spirit and scope of the invention as defined in the appended claims.

What is claimed is:

1. An attenuator valve insertable into a pressure-gas conduit for attenuating the impact pressure of the pressurized gas downstream of the source of the pressurized gas, the attenuator valve being insertable between a sealing valve and said source, the attenuator valve comprising:
    a housing defining a recess having a bottom facing toward said source and an outer end facing away from said source;
    mounting means for mounting said housing in the conduit;
    a structure having a cavity formed therein and being mounted in said recess with said cavity facing the bottom of said recess;
    a valve body movably mounted in said cavity so as to cause one end of said valve body and said structure to conjointly define an enclosed chamber in at least part of said cavity;
    first passage means formed in said housing and extending from said recess to said outer end of said housing;
    valve seat means formed in said recess so as to extend into said first passage means;
    valve closure means formed on the other end of said valve body and adapted for contact engaging said valve seat means to close off said first passage means with respect to said recess;
    resilient means acting on said valve body for resiliently holding said valve closure means in contact engagement with said valve seat means;
    second passage means for connecting said first passage means with said chamber;
    throttle means connecting said chamber with said source for allowing an immediate initial limited flow of the gas to pass into said chamber from said source when the sealing valve is opened thereby causing the pressure in said chamber to drop to a level less than the pressure of said source as said limited flow passes on through said second passage means and then through said first passage means with attenuated impact pressure downstream of the sealing valve; and,
    third passage means connecting said other end of said valve body to said source for permitting gas at the pressure of said source to displace said valve body against the force of said resilient means after the pressure in said chamber has fallen thereby moving said valve closure means away from said valve seat means after said initial limited flow and increasing the flow of the gas passing through said first passage means without impact pressure downstream thereof.

2. The attenuator valve of claim 1, said first passage means being a first bore and said valve seat means being a conical valve seat formed in said housing at the end of said bore facing said valve closure means of said valve body; said valve closure means being a cone-like projection adapted for seating in said conical valve seat; said second passage means being a second bore formed in said valve body connecting said first bore with said chamber; said structure and said housing conjointly defining a space communicating with said other end of said valve body; and, said third passage means being a plurality of bores formed in said structure for connecting said space with said source.

3. The attenuator valve of claim 2, comprising an o-ring for sealing said valve body with respect to the wall of said cavity; and, said throttle means being a throttle opening formed in said structure connecting said source to said chamber.

4. The attenuator valve of claim 3, said valve body having an opening formed in said one end thereof; and, said resilient means being a spring seated in said chamber and guidingly held in said opening.

5. A valve assembly for conducting gas to equipment from pressurized-gas cylinders, the valve assembly comprising:
    a housing defining a recess having a bottom facing toward said source and an outer end facing away from said source;
    mounting means for mounting said housing in the pressurized-gas cylinder;
    a sealing valve mounted in said outer end of said housing;
    a structure having a cavity formed therein and being mounted in said recess with said cavity facing the bottom of said recess;
    a valve body movably mounted in said cavity so as to cause one end of said valve body and said structure to conjointly define an enclosed chamber in at least part of said cavity;
    first passage means formed in said housing and extending from said recess to said sealing valve;
    valve seat means formed in said recess so as to extend into said first passage means;
    valve closure means formed on a portion of the other end of said valve body and adapted for contact engaging said valve seat means to close off said first passage means with respect to said recess;
    resilient means acting on said valve body for resiliently holding said valve closure means in contact engagement with said valve seat means;

second passage means for connecting said first passage means with said chamber;

throttle means connecting said chamber with said source for allowing an immediate initial limited flow of the gas to pass into said chamber from said source when said sealing valve is opened thereby causing the pressure in said chamber to drop to a level less than the pressure of said source as said limited flow passes on through said second passage means and then through said first passage means and out through said sealing valve with reduced impact on the equipment downstream of said sealing valve; and, third passage means connecting the remaining portion of said other end of said valve body to said source for permitting gas at the pressure of said source to act on said remaining portion of said other end of said valve body to displace said valve body against the force of said resilient means after the pressure in said chamber has fallen thereby moving said valve closure means away from said valve seat means after said initial limited flow and increasing the flow of the gas passing through said first passage means and sealing valve to said equipment without a significant pressure impact thereon.

* * * * *